United States Patent
Chan et al.

(10) Patent No.: US 8,271,258 B2
(45) Date of Patent: Sep. 18, 2012

(54) EMULATED Z-SERIES QUEUED DIRECT I/O

(75) Inventors: Ping T. Chan, Fishkill, NY (US); Paul M. Gioquindo, Poughkeepsie, NY (US); Gary R. Morrill, Shrewsbury, MA (US); Bruce H. Ratcliff, Red Hook, NY (US); Stephen R. Valley, Valatie, NY (US)

(73) Assignee: International Business Machines Corporation, Armonk, NY (US)

( * ) Notice: Subject to any disclaimer, the term of this patent is extended or adjusted under 35 U.S.C. 154(b) by 935 days.

(21) Appl. No.: 11/693,841

(22) Filed: Mar. 30, 2007

(65) Prior Publication Data

US 2008/0243467 A1    Oct. 2, 2008

(51) Int. Cl.
    *G06F 9/455*     (2006.01)
    *G06F 13/00*     (2006.01)
    *G06F 13/28*     (2006.01)

(52) U.S. Cl. ............................ 703/23; 711/154; 711/165

(58) Field of Classification Search .................... 703/23; 711/154, 165

See application file for complete search history.

(56) References Cited

U.S. PATENT DOCUMENTS

| | | | | |
|---|---|---|---|---|
| 5,574,945 A | * | 11/1996 | Elko et al. | 710/5 |
| 5,706,415 A | * | 1/1998 | Kelley et al. | 345/426 |
| 5,706,432 A | * | 1/1998 | Elko et al. | 709/213 |
| 5,870,097 A | * | 2/1999 | Snyder et al. | 345/426 |
| 6,943,804 B2 | * | 9/2005 | Alcorn et al. | 345/582 |
| 6,976,083 B1 | | 12/2005 | Baskey et al. | |
| 7,395,199 B2 | * | 7/2008 | Carroll et al. | 703/23 |
| 2002/0004835 A1 | * | 1/2002 | Yarbrough | 709/230 |
| 2003/0037178 A1 | * | 2/2003 | Vessey et al. | 709/319 |
| 2003/0093649 A1 | | 5/2003 | Hilton | 712/41 |
| 2007/0288921 A1 | * | 12/2007 | King et al. | 718/1 |

OTHER PUBLICATIONS

M. Zee, J.W. Stevens, B. L Thompson J. A. Fowler, J. Goldman, P. T. Chan, and T.P. McSweeney, "IBM System z9 Open System Adapter for Communication Controller for Linux", Jan./Mar. 2007.*
Frank Injey, Parwez Hamid, Ken Hewitt, Dick Jorna, and Patrick Kappeler, "IBM System z9 109 Technical Guide", Oct. 2005.*
Bill White, Rama Ayyar, and Velibor Uskokovic, "zSeries HiperSockets", IBM, May 2002.*
M. E. Baskey, "zSeries features for optimized sockets-based messaging: HiperSockets and OSA-Express", Jul. 2002.*
Franck Injey, Non Patent Publication, "IBM (e)TM Server zSeries 900 Technical Guide", Sep. 2002.*
"IBMJournal of Research and Development," vol. 46, No. 4/5, Jul./Sep. 2002.

* cited by examiner

*Primary Examiner* — David Silver
*Assistant Examiner* — Angel Calle
(74) *Attorney, Agent, or Firm* — John E. Campbell; Blanche E. Schiller, Esq.; Heslin Rothenberg Farley & Mesiti, P.C.

(57) ABSTRACT

The emulation of an adapter for I/O to link a host data processing system to a local area network provides advantages of memory to memory transfer which results in higher data transfer rates while at the same time providing a mechanism for working with two data transfer vectors in an overlapping fashion.

21 Claims, 8 Drawing Sheets

EMULATED Z-SERIES QUEUED DIRECT I/O

TECHNICAL FIELD

In general, the present invention relates to the emulation of an input/output (I/O) adapter employed in data processing systems. Unlike other emulation efforts, the present invention is not directed to the emulation of the central processing unit (CPU) instructions of a data processing system, even if those instructions are directed to I/O operations. Rather, the present invention is directed to the emulation of hardware adapters which carry out Queued Direct I/O (QDIO) operations. Even more particularly, the present invention is directed to the emulation of the Open Systems Adapter and its I/O protocols.

BACKGROUND OF THE INVENTION

As indicated, the present invention is directed to emulation. However, unlike emulation of central processing units and their associated architectures, the present invention is directed to the emulation of an I/O (input/output) adapter. Accordingly, in order to provide a better description of the present invention, it is useful to have a basic understanding of its background of adapters and the environment in which they are employed. Firstly, therefore, it is important to understand that an adapter, in the data processing sense of the word, is simply a hardware device which is used to communicate between a host (data processing) system and one or more external devices. Thus, an adapter is seen to provide one form of I/O connectivity in a data processing system. More particularly, the present invention is primarily, though not exclusively, directed to what is referred to as the Open System Adapter (OSA), a product offered by the assignee of the present invention. This adapter provides a protocol for data transmission between a host system memory and a data network. Even more particularly, the data network to which the protocol is directed is a LAN (Local Area Network).

The Open System Adapter employs the QDIO protocol. An example of a system that employs this protocol is seen in U.S. Pat. No. 6,976,083 issued to the assignee of the present invention. The QDIO architecture is also described in Volume 46, Numbers 4/5, 2002 of the IBM Journal of Research and Development.

The Open System Adapter couples a host system to a network for I/O transfer in both directions. One of the characteristics of this protocol is that it involves the use of polling. For example, on the host side, polling is undertaken on a periodic basis, say every 10 milliseconds, to see if there is any data to be transferred from the network I/O buffers to the host system memory. Most of the time the polling results in a negative response, meaning that there is no data to be transferred. Likewise, polling is undertaken on the network side to see if there is a request from the host to send data to the network I/O buffer(s). Since most of the time this polling is likely to result in no data being transferred, its elimination is desirable. It is an unexpected result that emulation of the Open System Adapter results in a system and method in which this polling is eliminated without impacting the operation of the Open System Adapter protocol.

Emulation technology is becoming more prevalent in the industry due to the rising cost of hardware development, especially on high end systems. The emulation approach advantageously provides a much lower cost of ownership of the product for pursuing application development. Furthermore, the resurgence of the mainframe class of machine has created an increased desire for code developers to write applications for this type of machine. One of the most significant ones of these high end systems is the zSeries Architecture® of data processor manufactured and marketed by the assignee of the present invention. However, the cost factor for these high end systems is discouraging program writers and designers from working in this area, especially for development and for training purposes. Several vendors now provide zSeries processor emulations that run on either a UnixWare or Linux based workstation. However, included with the processor emulation is the increasing desire to emulate other parts of the system including DASD, coupling, I/O, and networking functions. Queued direct I/O was introduced in 1990. It is a state-of-the-art I/O architecture which provides fast host to LAN communication. With the emulator of the present invention, several changes have been made to enhance the architecture and to improve Queued Direct I/O (QDIO) function on Linux and AIX® platforms. The present application describes Queued Direct I/O enhancements used to perform the Open System Adapter (OSA) function on the zSeries emulation platform.

In order to provide a better description of the present invention, it is useful to have a basic understanding of its background and its environment. Firstly, therefore, it is important to understand that an adapter, in the data processing sense of the word, is simply a hardware device which is used to communicate between a host system and one or more external devices. An adapter thus is seen to provide one form of input/output (I/O) in a data processing system. More particularly, the present invention is primarily, though not exclusively, directed to what is referred to as the Open System Adapter (OSA), a hardware product offered by the assignee of the present invention. This adapter provides a protocol for data transmission between a host system memory and a data network. Even more particularly, the data network to which the protocol is directed is a LAN (Local Area Network).

SUMMARY OF THE INVENTION

The present invention provides a method for emulating, within a host system memory, a queued direct data transfer protocol. The method employs the following steps. A connection between a first portion of the host system memory which is allocated to input/output operations and a second portion of the host system memory which is allocated to network buffer operations is established. Certain parameters used for directing and structuring data transfer between said memory portions are initialized. Both a working data pending description vector and a currently active data pending description vector are created. Data is transferred, via a memory copy operation, between the host system memory portions in accordance with the parameters through the use of one of the data pending description vectors. The present invention is also directed to an computer readable medium which contains instructions for carrying out the steps above within a host data processing system.

While at some level, the operations carried out herein in host system memory may at first blush simply appear to be a transfer of data from one portion of the host system memory to another, there are far more complicated things taking place than simply copying data from one memory portion to another. All of these memory to memory transfers are carried out in accordance with the protocols set forth in the Open Systems Adapter protocol.

A new way of storing, setting, and fetching the Queued Direct I/O work vector is presented herein. This work vector drives the communication between a host and a networking or I/O device. A new signal is presented which allows this function to work in a multi-process environment, such as the one provided by the aforementioned emulators. This new method greatly optimizes work vector manipulation and lends itself to a streamlined method for processing I/O in the system.

Additional features and advantages are realized through the techniques of the present invention. Other embodiments and aspects of the invention are described in detail herein and are considered a part of the claimed invention.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects advantages thereof, may best be understood by reference to the following description taken in connection with the accompanying drawings in which:

DETAILED DESCRIPTION

Figure 1:
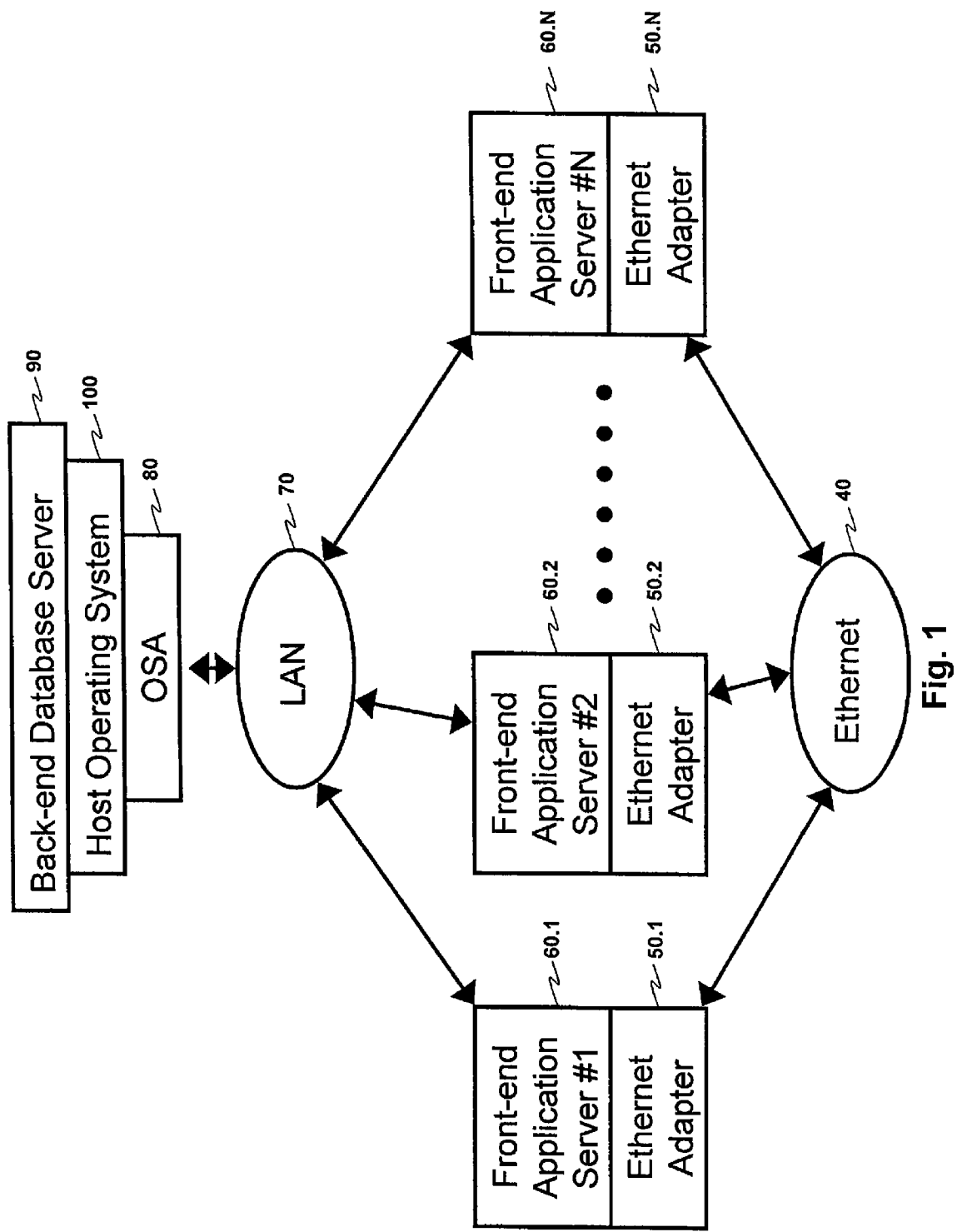
FIG. 1 illustrates the typical environment in which an Open Systems Adapter is employed.

FIG. 1 illustrates the conventional environment in which Open System Adapter 80 is employed. In particular, Open System Adapter 80 communicates with host operating system 100, which may for example be running a back-end database server 90. Open System Adapter 80 provides an input and output path to Local Area Network 70. Front end applications 60.1 through 60.N run on a plurality of servers as shown and communicate with Local Area Network 70. These servers are also often provided with other links to various communication networks such as via the Ethernet network 40 shown. Accordingly, it is seen that Open System Adapter 80 is a key element in the communications link between host operating system 100 and the rest of the external networked world.

Figure 2:
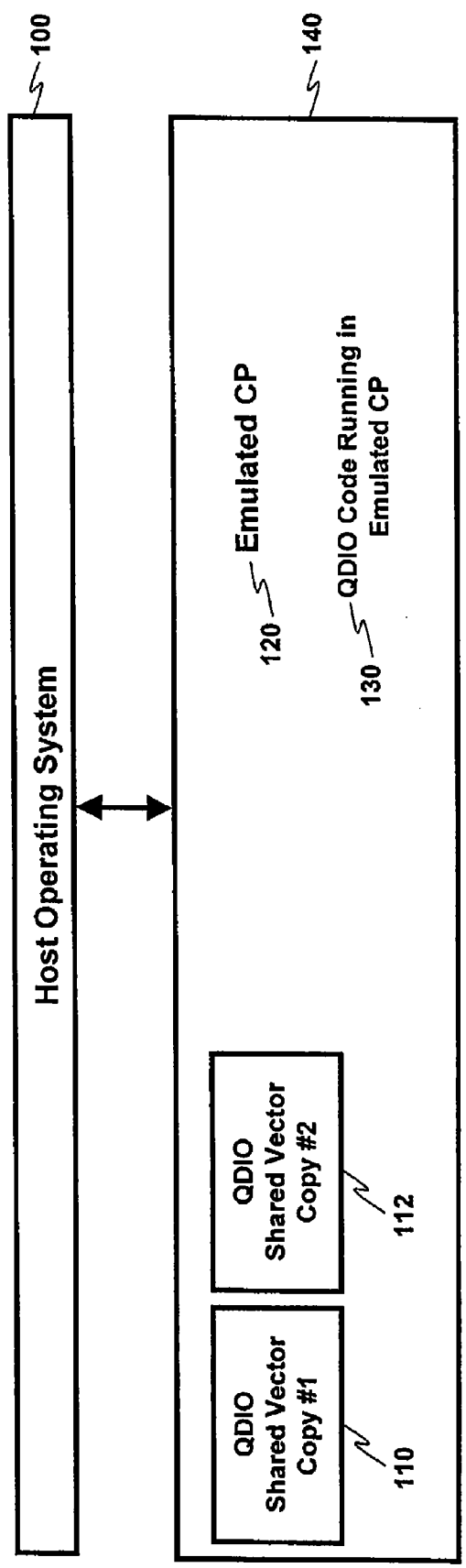
FIG. 2 is a block diagram which provides a slightly more detailed view of the relation between the host operating systems and the emulation structure of the present invention.

FIG. 2 provides a somewhat more detailed view of the relation between host operating system 100 and the QDIO emulation portion 140. In particular, it is seen that emulated QDIO code 130 is running on an emulated central processor 120. However, it is noted that the present invention is not limited to the use of emulated central processor units. Also of note with respect to FIG. 2 is that, in accordance with the present invention, emulated QDIO portion 140 includes two copies (110 and 112) of the QDIO shared vector, which is used for communication with the emulated Open System Adapter. These vectors are also described as pending data transfer vectors. One of these vectors is employed as a working copy, and the other is employed as an active copy. Using both of these vectors facilitates an increase in the overall data transfer rate. Conventional QDIO processing does not employ two vectors to achieve this purpose. However, in an emulation environment, it is easily possible to structure the emulation software in such a manner that two vectors may be employed so that it is possible to switch back and forth between them. This is one of the advantages provided by the use of emulation software.

Figure 3:
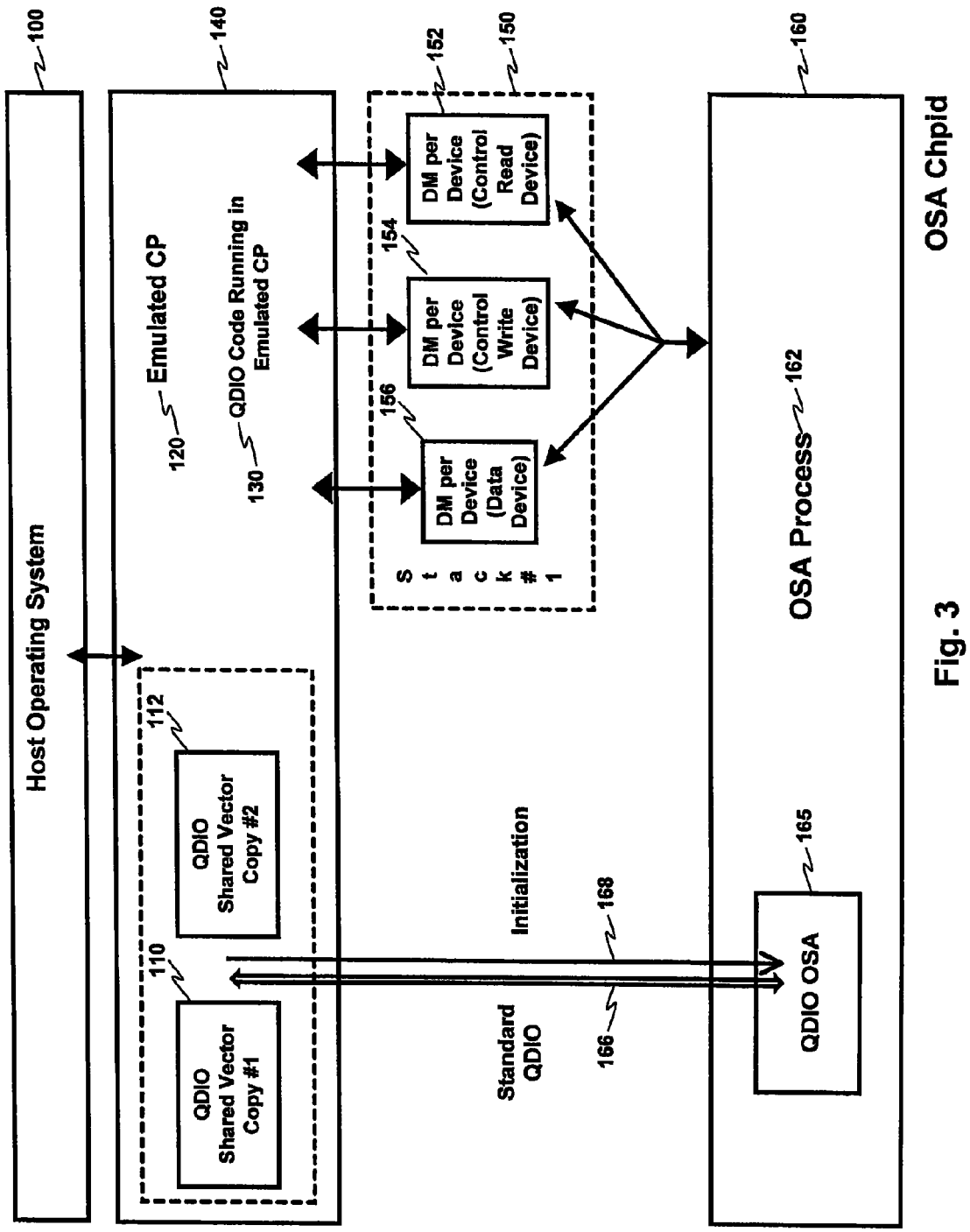
FIG. 3 is a block diagram illustrating the structural configuration of the elements employed in the present invention.

FIG. 3 provides an even more detailed description of the present invention, and in particular, illustrates the emulation of the Open System Adapter via software 160. This software includes code 162 which is employed to emulate the OSA process. Even more particularly, emulation software 160 includes code 165 for emulating the transfer of data to and from host operating system 100 via the QDIO protocol. This transfer occurs via the standard QDIO protocol as shown by arrow 166. However, before data transfer takes place an initialization operation is performed, as indicated by arrow 168. This initialization transfers specific protocol parameters relating to one of the QDIO vectors to emulated QDIO process 165 running in emulated portion 160.

From an overall perspective, FIG. 3 also illustrates a single "Chpid," that is, a CHannel Path ID, a unique identifier in the I/O subsystem in the range of 0-255 that identifies an I/O path. In general, it should be appreciated that in a typical data processing system, there are many channel paths. For purposes of illustration, only one is illustrated in FIG. 3. The emulation process also employs device managers (DM) 152, 154, and 156 in stack #1 (reference numeral 150). These device managers communicate with QDIO code 130 running in a emulator portion 140. They also communicate with process 162 in emulator portion 160. As indicated in FIG. 3, each device is provided with its own device manager. These device managers are typically divided into portions that provide reading functionality, writing functionality and data service functionality for their respective devices. While only one stack is shown for clarity, others may be present as well to serve the same function.

The shared memory blocks for QDIO block are allocated by the emulated Open System Adapter (OSA) initialization code. The CP (Central Processor—either real or emulated) provides a routine in code 120 that copies the latest SIGA a vector into OSA space and then sends the OSA process a SIGUSR1 signal. The SIGA vector is a vector that indicates pending data for transfer to the OSA process portion. SIGUSR1 is a signal which indicates that the transfer operation is now ready. This SIGUSR1 signal causes OSA 162 process to wake up and to fetch the SIGA vector by the above routine. Once copied, the vector is not fetched again until all work is completed. A secondary copy of the vector is also managed by the CPU and allows for the atomic setting of SIGA bits by multiple CPU processes. An algorithm was developed to minimize the host to output device interaction. AIX® or Linux services are used to quickly manipulate and manage the copies of the vector so as to provide the fastest communication path in the system.

A simple diagram of the QDIO function is provided in FIG. 2. The OSA QDIO process works in conjunction with the host QDIO emulator to provide fast host to LAN (or I/O or internal LPAR to LPAR traffic—LPAR is an acronym for "Logical Partition"). FIG. 3 illustrates the new QDIO infrastructure in the zSeries Architecture® emulator environment.

Figure 6:
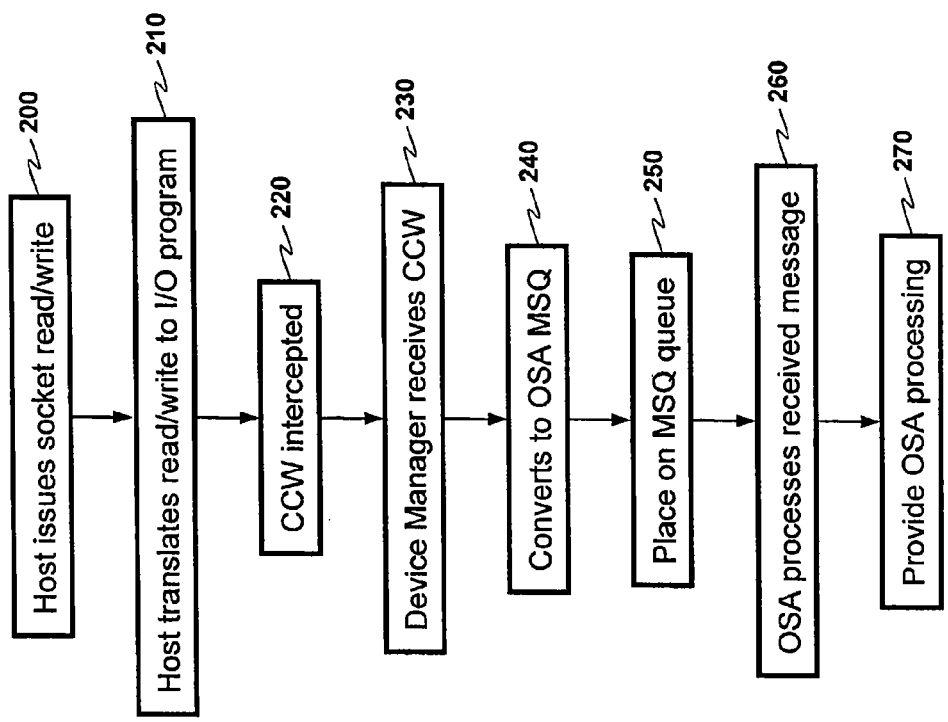
FIG. 6 is a flow chart illustrating the process that occurs during operation of the present emulator.

FIG. 6 is a flow chart illustrating the process that occurs during operation of the emulator. Initially, the host issues a socket for reading and writing operations, (step 200). The host then translates a read or write request to an I/O program (step 210). Next, the channel command word (CCW) is intercepted (step 220). Next, a device manager receives the channel command word (step 230) and converts it so that it can be placed on the open systems adapter message queue (step 240). The OSA process (reference 162) receives the queued message and processes it (steps 260 and 270).

Figure 7:
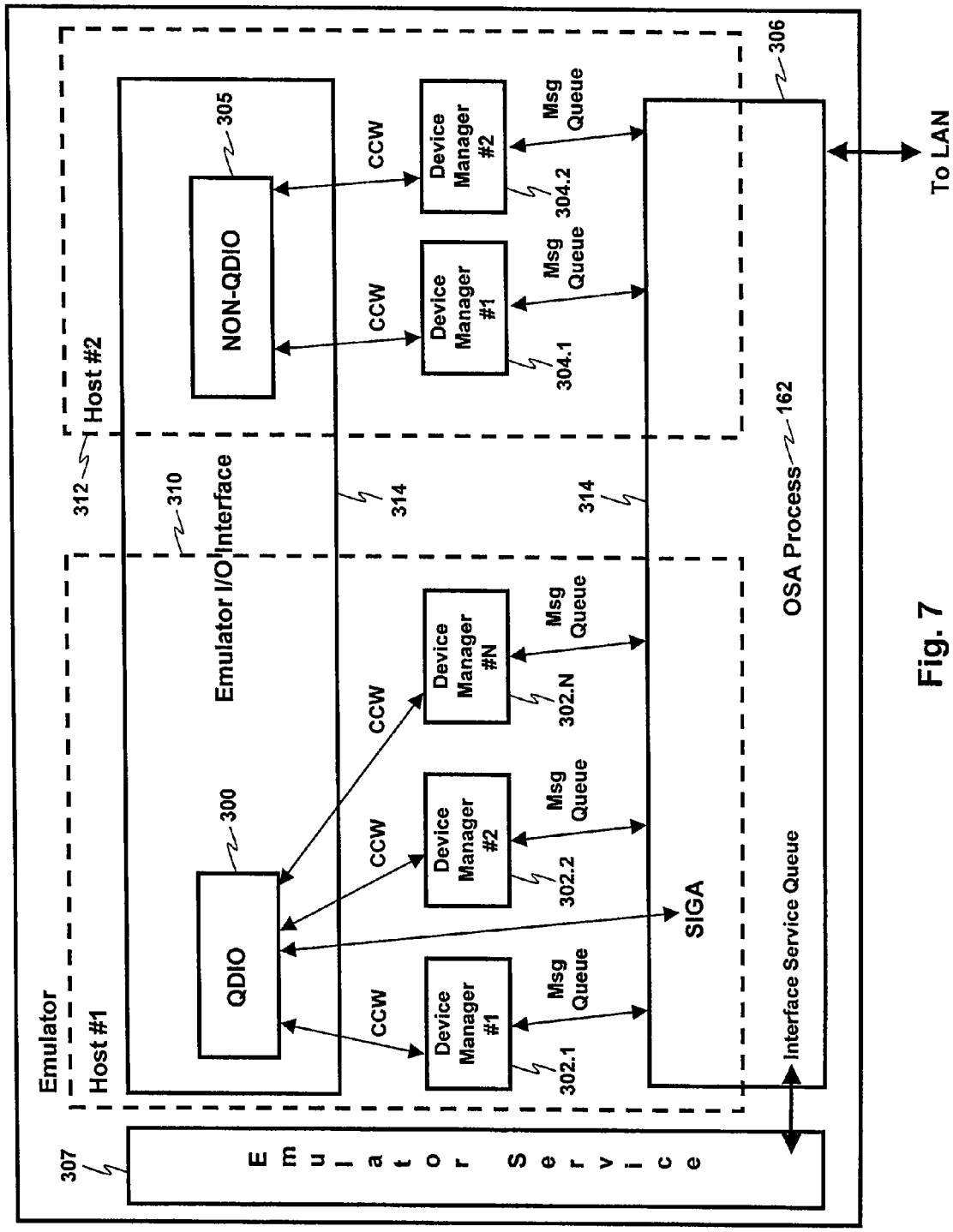
FIG. 7 is similar to FIG. 3 except that it more particularly illustrates the fact that the emulator of the present invention may be employed with multiple hosts.

FIG. 7 is similar to FIG. 3 except that it more particularly illustrates the fact that the emulator of the present invention may be employed with multiple hosts (310 and 312). FIG. 7 also illustrates the fact that not all of the hosts that communicate with the emulator are required to employee the same I/O protocol. In particular, it is seen in FIG. 7 that Host #1 employs a QDIO protocol (300), while Host #2 uses a non-QDIO protocol (305). As with FIG. 3, FIG. 7 illustrates the role played by the various device managers (302.1 through 302.N and 304.1 through 304.2). Whether the protocol employed is the QDIO protocol (300) or another protocol (305), in each case, a channel command word (CCW) is passed to a device manager. Ultimately in each case, the device manager places the result of the channel command word instruction in a message queue to be picked up via the emulated OSA process (162). The code for the OSA process is contained in code portion 306, which also contains an interface service queue which communicates with emulator service routine 307.

Figure 8:
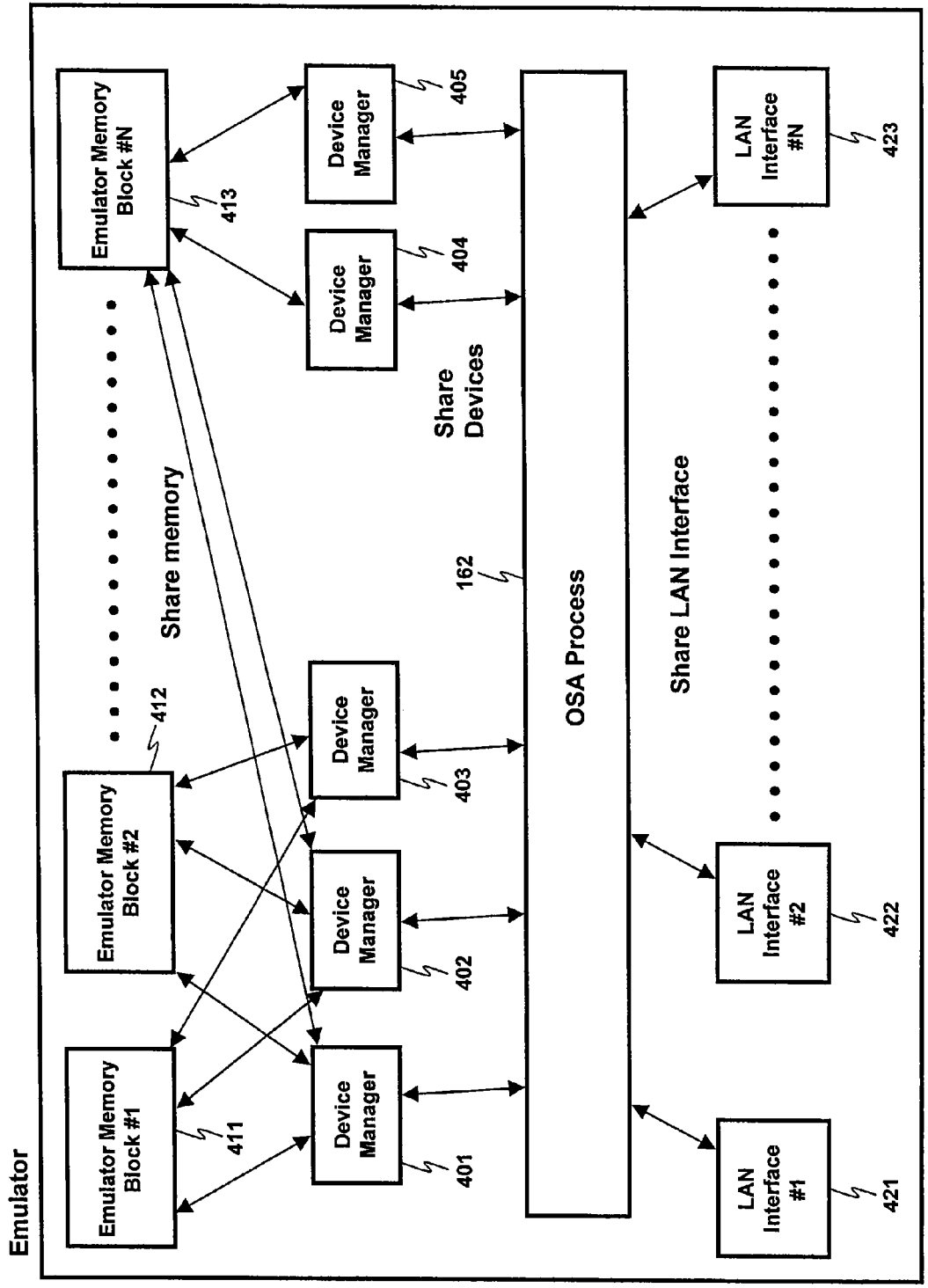
FIG. 8 illustrates two further aspects of the present invention relating to LAN interfaces and shared memory blocks.

FIG. 8 illustrates two further aspects of the present invention. In particular, it is seen that OSA process 162 is capable all of communicating to a local area network through a plurality of LAN interfaces (421 through 423). It is also seen in that the device managers (here labeled 401 through 405) communicate with various emulator memory blocks, 411 through 413, in a shared portion of memory dedicated to emulator function.

Figure 9:
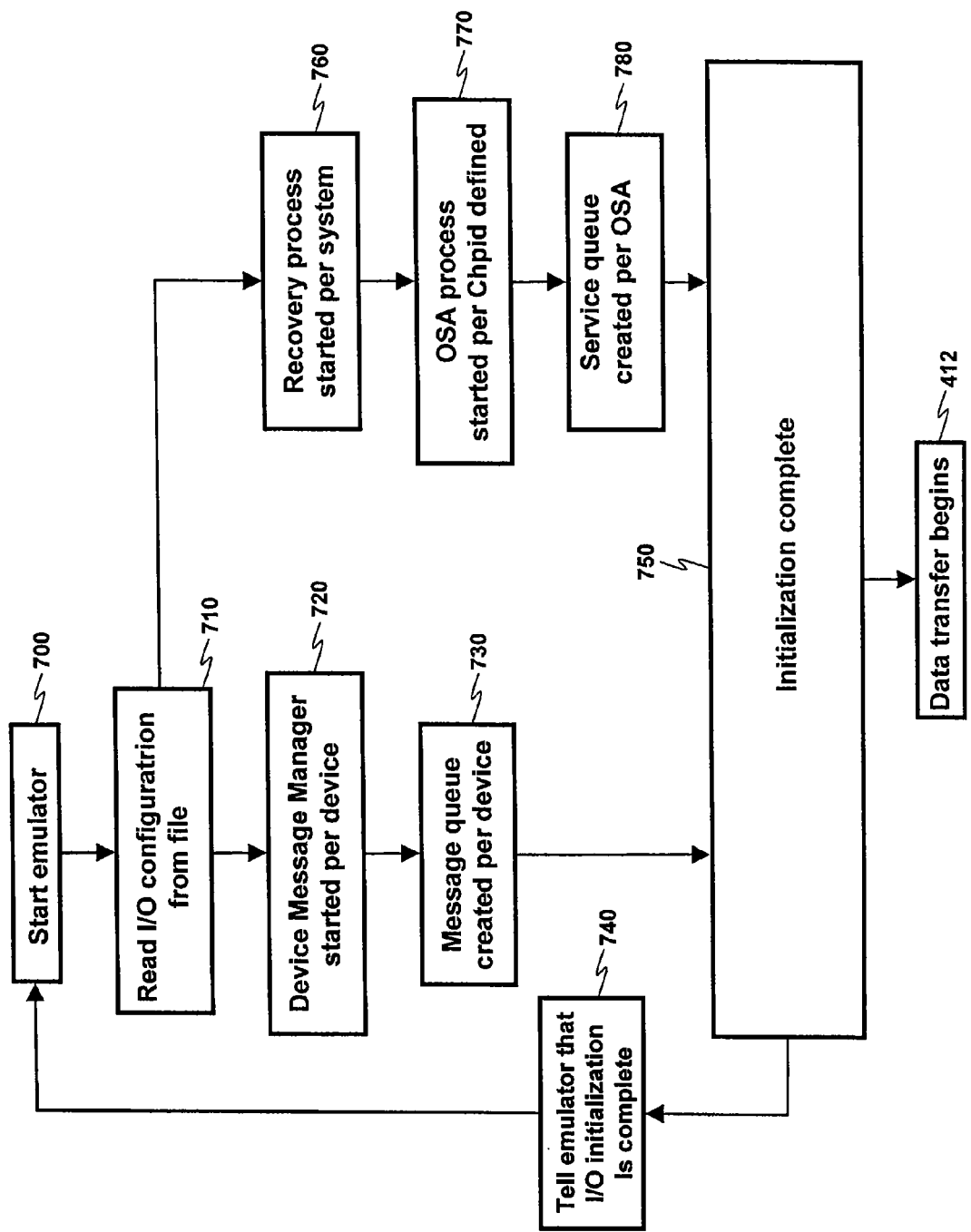
FIG. 9 illustrates a detailed view of initialization occurring prior to data transfer.

As indicated above, before data transfer occurs, and initialization step is carried out. A detailed view of this initialization is illustrated in FIG. 9. In particular, once the emulator is started (step 700), the I/O configuration is read from the subject file (step 710). Two processes occur at this point, one of which is devoted to the establishment of a recovery process in the event of an error. In the broadest scope of applicants invention, the recovery process is optional. However, once the configuration file has been read, for each device a device message manager is started within the emulator (step 720). Next, for each device, a message queue is created (step 730). At this point in this part of the initialization is complete (step 750). Additionally, once initialization is complete, the emulator is informed of this event.

As indicated above, it is also desirable and readily possible within the emulator framework for and adapter, for each host system a recovery process is started (step 760). Next, for each channel path identifier and OSA process is started (step 770). Lastly, for each OSA process that is started, a service queue is created (step 780). Processing then continues as in step 750.

The shared memory managed for DM OSA's is structured as shown in the following table:

TABLE I

| Area Name/Reason | Size |
|---|---|
| SIGA vector | 2 copies, 256 bytes—allocated by QDIO CP code |
| SIGA vector mapping table | 256 bytes—allocated and filled out by OSA |
| I/O Chpid block | 128K per system—allocated and filled out by OSA_main |

In a typical Open System Adapter based system, the hardware is limited to talking to instances of the Host OS or LAN that are connected physically to the Open System Adapter. This limits the amount of storage or LAN connectivity that a particular Open System Adapter can have when it is connected to a zSeries Architecture® machine (zSeries Architecture is a registered trademark of the assignee of the present invention). Under the "emulated" system described herein, the Open System Adapter can share across any number of Host operating systems and more importantly across several LAN instance as well. This opens up a new slew of possible connectivity opportunities presently unavailable in a zSeries Architecture® machine. Because this adapter is emulated, any LAN interface or hardware physical layer (wireless capability for example) can be immediately shared (versus Open System Adapter is Ethernet only). A routing layer can be created that provides connectivity between ports and Host instances in both layer 2 (physical layer) or layer 3 (application layer) environments. The present invention also provides robust recovery. Present Open System Adapter technology only allows a failing OSA to manage and recover itself. In this emulation environment a new recovery paradigm is introduced wherein an OSA recovery process oversees the entire OSA infrastructure in the system and performs recovery actions (such as port switching or hot Host backup) that is not present today in a zSeries® OSA environment. New data transport mechanisms are also employable using this recovery capability. Link aggregation or striping is easily implemented. In addition, since the overall OSA process is integrated into the CPU and emulator base, when a failure happens, an error log is generated that gathers all OSA and CPU data. The system is no longer constrained by the amount of logging memory provided to the zSeries® Open System Adapter. Depending on the specific failure, all the data is automatically synced with the CPU data gathered and provided to service personnel for data analysis.

A sequence of program instructions or a logical assembly of one or more interrelated modules defined by one or more computer readable program code means or logic direct the performance of one or more aspects of the present invention.

Figure 5:
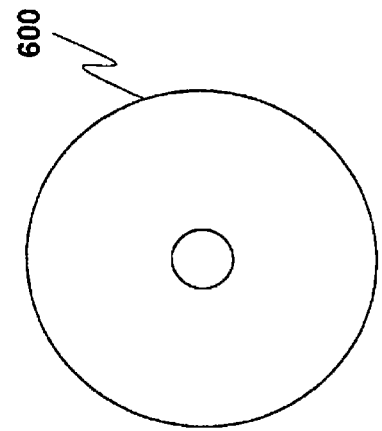
FIG. 5 is a top view of a computer readable medium that is capable of storing machine instructions, and source code as well, which implement the current invention.
Figure 4:
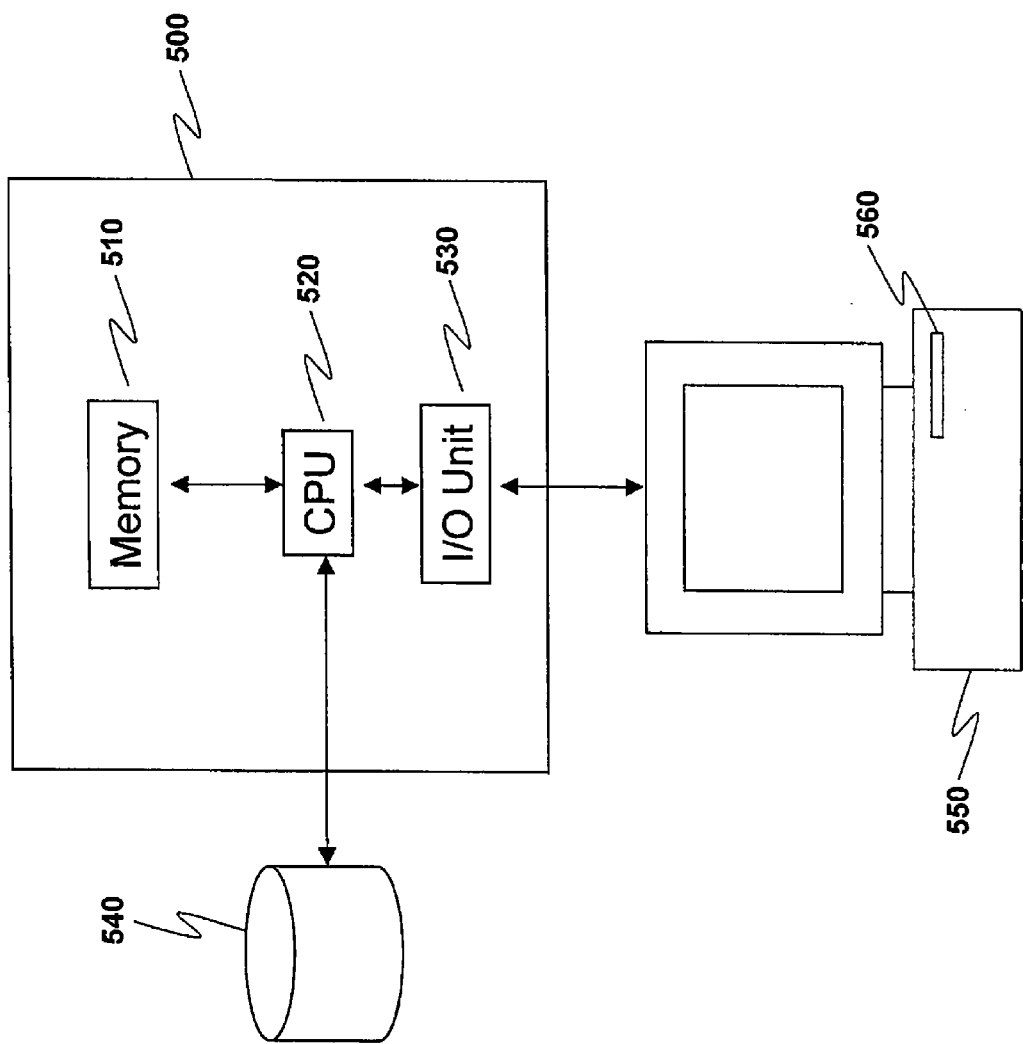
FIG. 4 is a block diagram illustrating the structure of one form of host data processing system in which the present invention may be employed.

In any event one of the environments in which the present invention operates is shown in FIG. 4. The present invention operates in a data processing environment which effectively includes one or more of the computer elements shown in FIG. 4. In particular, computer 500 includes central processing unit (CPU) 520 which accesses programs and data stored within random access memory 510. Memory 510 is typically volatile in nature and accordingly such systems are provided with nonvolatile memory typically in the form of rotatable magnetic memory 540. While memory 540 is preferably a non-volatile magnetic device, other media may be employed. CPU 530 communicates with users at consoles such as terminal 550 through Input/Output unit 530. Terminal 550 is typically one of many, if not thousands, of consoles in communication with computer 500 through one or more I/O unit 530. In particular, console unit 550 is shown as having included therein a device for reading medium of one or more types such as CD-ROM 600 shown in FIG. 5. Media 600, an example of which is shown in FIG. 5, comprises any convenient device including, but not limited to, magnetic media, optical storage devices and chips such as flash memory devices or so-called thumb drives. Disk 600 also represents a more generic distribution medium in the form of electrical signals used to transmit data bits which represent codes for the instructions discussed herein. While such transmitted signals may be ephemeral in nature they still, nonetheless constitute a physical medium carrying the coded instruction bits and are intended for permanent capture at the signal's destination or destinations.

One example of an article of manufacture or a computer program product incorporating one or more aspects of the present invention is described with reference to FIG. 5. A computer program product includes, for instance, one or more computer usable media 600 to store computer readable program code means or logic thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

Although various embodiments are described above, these are only examples. For instance, one or more aspects of the present invention can be included in environments that are not emulated environments. Further, one or more aspects of the present invention can be used in emulated environments that have a native architecture that is different than the one described above and/or emulates an architecture other than the z/Architecture®. Various emulators can be used. Emulators are commercially available and offered by various companies.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A computer program product for emulating a data transfer protocol, the computer program product comprising:
a non-transitory storage medium readable by a processor and storing instructions for execution by the processor for performing a method comprising:
establishing a connection between a first portion of a host system memory allocated for input/output operations and a second portion of said host system memory allocated to network buffer operations;
establishing a plurality of pending data transfer vectors, said plurality of pending data transfer vectors comprising two copies of a shared vector including a working data pending description vector and a currently active data pending description vector, the working data pending description vector being a working copy of the shared vector and the currently active data pending description vector being an active copy of the shared vector;
initializing parameters used for directing and structuring a data transfer between said first and second memory portions of said host system memory, said initializing transferring parameters to an emulated process used in data transfer, the parameters indicating which of the plurality of pending data transfer vectors is being employed as the currently active data pending description vector, the parameters distinguishing the currently active data pending description vector from the working data pending description vector; and
transferring data, via a memory copy operation between said first and second memory portions of said host system memory in accordance with said parameters and using said currently active data pending description vector, wherein the parameters indicate which of the plurality of pending data transfer vectors is the currently active data pending description vector to be used in the transferring of data.

2. The computer program product of claim 1, wherein the data transfer protocol being emulated is employed by an Open System Adapter.

3. The computer program product of claim 1, wherein said data transfer is from said first memory portion to said second memory portion.

4. The computer program product of claim 1, wherein said data transfer is from said second memory portion to said first memory portion.

5. The computer program product of claim 1, wherein a role of said working data pending description vector is as a working vector and a role of said currently active data pending description vector is as an active vector, and wherein said method further includes reversing the roles of said working data pending description vector and said currently active data pending description vector, wherein said working data pending description vector becomes the active vector and said currently active data pending description vector becomes the working vector.

6. The computer program product of claim 1, wherein said method further includes starting a recovery process to handle errors in said data transfer.

7. The computer program product of claim 1, wherein said data transfer is carried out via a QDIO protocol.

8. The computer program product of claim 1, wherein said data transfer is carried out via a non-QDIO protocol.

9. The computer program product of claim 1, wherein said initializing comprises:
reading an I/O configuration from a file;
starting a device message manager; and
creating a message queue.

10. The computer program product of claim 9, wherein said method further comprises starting a device message manager for each one of a plurality of devices, and creating a message queue for each one of a plurality of devices.

11. A computer system for emulating a data transfer protocol, the computer system comprising:
a memory; and
a processor in communications with the memory, wherein the computer system is configured to perform a method, said method comprising:
establishing a connection between a first portion of a host system memory allocated for input/output operations and a second portion of said host system memory allocated to network buffer operations;
establishing a plurality of pending data transfer vectors, said plurality of pending data transfer vectors comprising two copies of a shared vector including a working data pending description vector and a currently active data pending description vector, the working data pending description vector being a working copy of the shared vector and the currently active data pending description vector being an active copy of the shared vector;

initializing parameters used for directing and structuring a data transfer between said first and second memory portions of said host system memory, said initializing transferring parameters to an emulated process used in data transfer, the parameters indicating which of the plurality of pending data transfer vectors is being employed as the currently active data pending description vector, the parameters distinguishing the currently active data pending description vector from the working data pending description vector; and transferring data, via a memory copy operation between said first and second memory portions of said host system memory in accordance with said parameters and using said currently active data pending description vector, wherein the parameters indicate which of the plurality of pending data transfer vectors is the currently active data pending description vector to be used in the transferring of data.

12. The computer system of claim 11, wherein the data transfer protocol being emulated is employed by an Open System Adapter, and wherein said data transfer is carried out via a QDIO protocol.

13. The computer system of claim 11, wherein said data transfer is from said first memory portion to said second memory portion or said data transfer is from said second memory portion to said first memory portion.

14. The computer system of claim 11, wherein a role of said working data pending description vector is as a working vector and a role of said currently active data pending description vector is as an active vector, and wherein said method further includes reversing the roles of said working data pending description vector and said currently active data pending description vector, wherein said working data pending description vector becomes the active vector and said currently active data pending description vector becomes the working vector.

15. The computer system of claim 11, wherein said data transfer is carried out via a non-QDIO protocol.

16. The computer system of claim 11, wherein said initializing comprises:
 reading an I/O configuration from a file;
 starting a device message manager; and
 creating a message queue.

17. The computer system of claim 16, wherein said method further comprises starting a device message manager for each one of a plurality of devices, and creating a message queue for each one of a plurality of devices.

18. A method for emulating a data transfer protocol, the method comprising:
 establishing a connection between a first portion of a host system memory allocated for input/output operations and a second portion of said host system memory allocated to network buffer operations;

establishing a plurality of pending data transfer vectors, said plurality of pending data transfer vectors comprising two copies of a shared vector including a working data pending description vector and a currently active data pending description vector, the working data pending description vector being a working copy of the shared vector and the currently active data pending description vector being an active copy of the shared vector;

initializing parameters used for directing and structuring a data transfer between said first and second memory portions of said host system memory, said initializing transferring parameters to an emulated process used in data transfer, the parameters indicating which of the plurality of pending data transfer vectors is being employed as the currently active data pending description vector, the parameters distinguishing the currently active data pending description vector from the working data pending description vector; and transferring data, via a memory copy operation between said first and second memory portions of said host system memory in accordance with said parameters and using said currently active data pending description vector, wherein the parameters indicate which of the plurality of pending data transfer vectors is the currently active data pending description vector to be used in the transferring of data.

19. The method of claim 18, wherein said initializing comprises:
 reading an I/O configuration from a file;
 starting a device message manager; and
 creating a message queue.

20. The method of claim 18, wherein a role of said working data pending description vector is as a working vector and a role of said currently active data pending description vector is as an active vector, and wherein said method further includes reversing the roles of said working data pending description vector and said currently active data pending description vector, wherein said working data pending description vector becomes the active vector and said currently active data pending description vector becomes the working vector.

21. The computer program product of claim 1, wherein the working data pending description vector is a first copy of a QDIO shared vector and is located in an emulated QDIO portion of the processor, and the currently active data pending description vector is a second copy of the QDIO shared vector and is located in the emulated QDIO portion of the processor.

* * * * *